US010866490B2

(12) United States Patent
Mizuochi (10) Patent No.: US 10,866,490 B2
(45) Date of Patent: Dec. 15, 2020

(54) ACCESSORY APPARATUS AND CAMERA SYSTEM

(71) Applicant: CANON KABUSHIKI KAISHA, Tokyo (JP)

(72) Inventor: Fuya Mizuochi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/505,413

(22) Filed: Jul. 8, 2019

(65) Prior Publication Data

US 2020/0026152 A1 Jan. 23, 2020

(30) Foreign Application Priority Data

Jul. 20, 2018 (JP) .................................. 2018-137136

(51) Int. Cl.
*G03B 17/14* (2006.01)
*H04N 5/225* (2006.01)

(52) U.S. Cl.
CPC ........... *G03B 17/14* (2013.01); *H04N 5/2254* (2013.01)

(58) Field of Classification Search
CPC ... G03B 17/14; H04N 5/2254; G02B 7/14–16
See application file for complete search history.

(56) References Cited

U.S. PATENT DOCUMENTS

| 6,167,201 A * | 12/2000 | Hara ...................... G02B 7/102 396/72 |
| 2009/0278557 A1* | 11/2009 | Taguchi .................. G03B 7/26 324/713 |
| 2013/0265657 A1* | 10/2013 | Hasegawa ................ G02B 9/60 359/755 |
| 2019/0129124 A1* | 5/2019 | Funaoka .................. G02B 7/09 |
| 2019/0302575 A1* | 10/2019 | Imamura ............... G02B 27/646 |
| 2020/0026157 A1* | 1/2020 | Funaoka ................ G03B 17/14 |

FOREIGN PATENT DOCUMENTS

JP 2001142590 A 5/2001

* cited by examiner

*Primary Examiner* — Jason A Flohre
(74) *Attorney, Agent, or Firm* — Canon U.S.A., Inc. IP Division

(57) ABSTRACT

An accessory apparatus includes a first electrical contact configured to receive power from an image capturing apparatus in a state of being attached to the image capturing apparatus, a second electrical contact disposed on a predetermined direction A side of the first electrical contact, configured to be connected to a predetermined electrical contact connected to a reference potential of the image capturing apparatus in the state of being attached to the image capturing apparatus, and configured to be unconnected to the reference potential during detachment from the image capturing apparatus, and a capacitor device connected to the first electrical contact and the second electrical contact. Further, the accessory apparatus includes a reduction unit configured to reduce charge stored in the capacitor device during the detachment from the image capturing apparatus.

8 Claims, 9 Drawing Sheets

COMPARATIVE EXAMPLE

ACCESSORY APPARATUS AND CAMERA SYSTEM

BACKGROUND OF THE DISCLOSURE

Field of the Disclosure

The present disclosure relates to an accessory apparatus and a camera system.

Description of the Related Art

When an accessory apparatus such as an interchangeable lens is attached to an image capturing apparatus, the accessory apparatus receives electric power and communicates with the image capturing apparatus through predetermined electrical contacts electrically connected to the image capturing apparatus.

If the accessory apparatus is rapidly removed from the image capturing apparatus, an excessive voltage may be applied to an electrical element in the accessory apparatus depending on the arrangement of the electrical contacts, and the application of the excessive voltage can damage the electrical element.

Japanese Patent Application Laid-Open No. 2001-142590 discusses a camera that includes a prior notice unit configured to provide a prior notice about removal of an optional apparatus. According to Japanese Patent Application Laid-Open No. 2001-142590, if the user operates the prior notice unit before removing the optional apparatus from the camera, the camera receives the prior notice from the prior notice unit and discharges residual charge stored in a circuit included in the optional apparatus.

The configuration discussed in Japanese Patent Application Laid-Open No. 2001-142590 is based on the image capturing apparatus that includes the prior notice unit. Therefore, in a case where the optional apparatus is attached to an image capturing apparatus that does not include the prior notice unit, an element included in the optical apparatus may be damaged when the optical apparatus is removed from the image capturing apparatus.

SUMMARY OF THE DISCLOSURE

According to an aspect of the present disclosure, an accessory apparatus configured to be attachable to and detachable from an image capturing apparatus and to be moved in a predetermined direction with respect to the image capturing apparatus so that the accessory apparatus is detached from the image capturing apparatus, and includes a first electrical contact configured to receive power from the image capturing apparatus in a state of being attached to the image capturing apparatus, a second electrical contact disposed on a side of the predetermined direction of the first electrical contact, configured to be connected to a predetermined electrical contact connected to a reference potential of the image capturing apparatus in the state of being attached to the image capturing apparatus, and to be unconnected to the reference potential during removal from the image capturing apparatus, a capacitor device with one end connected to the first electrical contact and another end connected to the second electrical contact, and a reduction unit configured to reduce charge stored in the capacitor device during the removal from the image capturing apparatus.

Further features and aspects of the present disclosure will become apparent from the following description of example embodiments with reference to the attached drawings.

DESCRIPTION OF THE EMBODIMENTS

Image capturing apparatuses and accessory apparatuses according to various example embodiments of the present disclosure will be described in detail below with reference to the attached drawings. Each component is given the same reference numeral in all the drawings, and duplicate descriptions are omitted.

As used herein, the term "accessory apparatus" refers to an apparatus that is attachable to and removable from an image capturing apparatus. The accessory apparatus is attached to the image capturing apparatus by connecting a mount unit of the accessory apparatus and a mount unit of the image capturing apparatus. The accessory apparatus includes a lens apparatus including an image capturing optical system. Further, the accessory apparatus includes an intermediate accessory apparatus attached between the lens apparatus and a main body of the image capturing apparatus.

The term "mount unit" refers to a connection unit provided on each of the image capturing apparatus and the accessory apparatus. The mount unit of the image capturing apparatus and the mount unit of the accessory apparatus each include electrical contacts, and if the accessory apparatus is attached to the image capturing apparatus, the electrical contacts of the mount units are brought into contact with each other. More specifically, the mount units have not only a function of mechanically connecting the main body of the image capturing apparatus and the accessory apparatus but also a function of electrically connecting the main body of the image capturing apparatus and the accessory apparatus.

Figure 1:
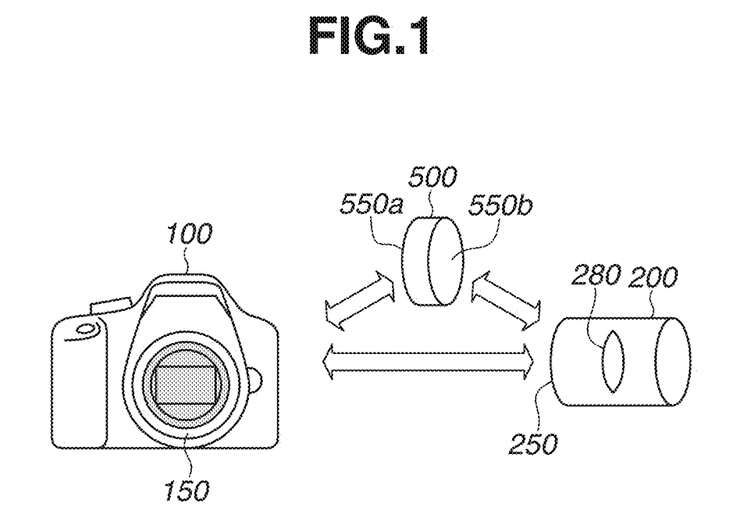
FIG. 1 is a schematic diagram illustrating an example relative relationship between an image capturing apparatus, a lens apparatus, and an intermediate accessory apparatus.

Next, a relative relationship between an image capturing apparatus, a lens apparatus, and an intermediate accessory apparatus according to an example embodiment will be described below with reference to FIG. 1. FIG. 1 illustrates the relative relationship between a camera 100, which is an image capturing apparatus according to the present example embodiment, a lens apparatus 200 according to the present example embodiment, and an intermediate accessory apparatus 500 according to the present example embodiment. Each arrow indicates that the apparatuses specified by an arrow are attachable to each other by connecting the mount units of the apparatuses. The lens apparatus 200 includes an imaging optical system 280. The camera 100 includes an image sensor such as a complementary metal oxide semiconductor (CMOS) sensor or charge-coupled device (CCD) sensor. The lens apparatus 200 is attached to the camera 100 to enable image capturing of a subject.

The lens apparatus 200 and the intermediate accessory apparatus 500 can be attached directly to the camera 100. In other words, a mount unit 250 of the lens apparatus 200 and a mount unit 550a of the intermediate accessory apparatus 500 are shaped so as to be connectable to a mount unit 150 of the camera 100.

Further, the intermediate accessory apparatus 500 includes a mount unit 550b as a second accessory mount unit in addition to the mount unit 550a as a first accessory mount unit attachable to the camera 100. The mount unit 550b has a shape similar to the shape of the mount unit 150 of the camera 100. With this configuration, the lens apparatus 200 is also attachable to the intermediate accessory apparatus 500. In other words, the lens apparatus 200 is attachable to the camera 100 through the intermediate accessory apparatus 500. Alternatively, another intermediate accessory apparatus (not illustrated) may be attached between the lens apparatus 200 and the intermediate accessory apparatus 500. In this case, two or more intermediate accessory apparatuses are attached between the lens apparatus 200 and the camera 100.

Figure 2A:
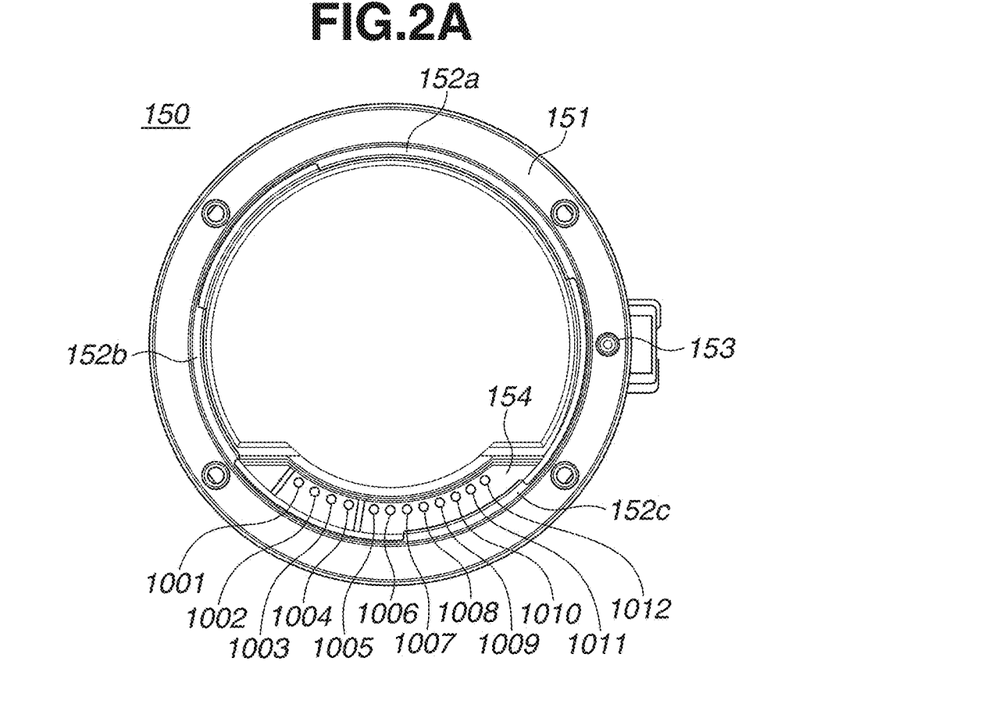
FIGS. 2A and 2B are diagrams illustrating a configuration of an example mount unit.
Figure 2B:
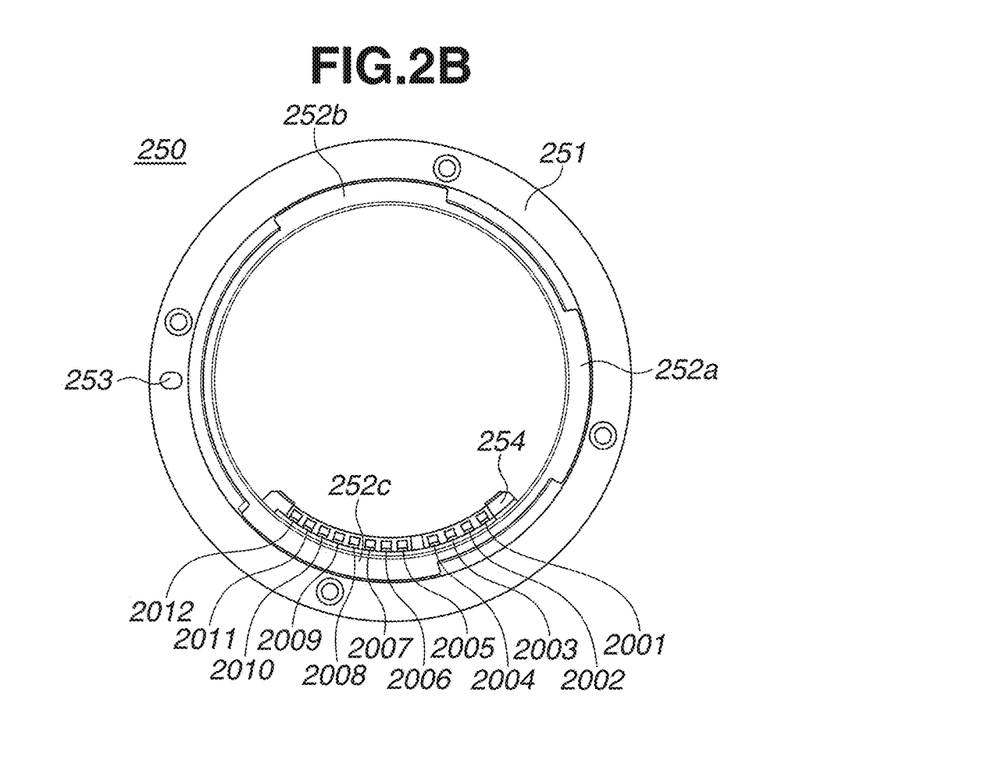

Next, each mount unit of the camera 100, the lens apparatus 200, and the intermediate accessory apparatus 500 will be described below with reference to FIGS. 2A and 2B. FIG. 2A is a schematic view illustrating the mount unit 150 of the camera 100 viewed from the object side, and FIG. 2B is a schematic view illustrating the mount unit 250 of the lens apparatus 200 viewed from the image plane side.

The mount unit 150 is provided on the front side (object side) of the camera 100. The mount unit 150 includes a ring-shaped mount reference surface 151 to secure a predetermined flange focal length. The inside of the mount reference surface 151 is provided with bayonet claws 152a to 152c disposed at three positions in a circumferential direction. Further, the mount unit 150 is provided with a lock pin 153 for positioning when the mount unit of the accessory apparatus (i.e., the mount unit 250 of the lens apparatus 200) is bayonet-connected to the mount unit 150. The lock pin 153 is provided to be projectable from and retractable into the mount reference surface 151. If the mount unit 150 of the camera 100 and the mount unit of the accessory apparatus are relatively rotated to a position at which the attachment is completed, the lock pin 153 is engaged with a fitting hole formed in the mount unit of the accessory apparatus.

Further, a camera-side contact holding portion 154 is provided in a region positioned on the inside of the bayonet claws 152a to 152c. The camera-side contact holding portion 154 holds electrical contacts (camera-side electrical contacts) 1001 to 1012.

The mount unit 550b of the intermediate accessory apparatus 500 has a configuration similar to that of the mount unit 150 illustrated in FIG. 2A.

The mount unit 250 is fixed to a rear end portion (image plane side) of the lens apparatus 200. The mount unit 250 includes a mount reference surface 251, which is ring-shaped and is a reference surface of the flange focal length. The inside of the mount reference surface 251 is provided with bayonet claws 252a to 252c disposed at three positions in a circumferential direction. Further, the mount unit 250 includes a fitting hole 253. When the lens apparatus 200 is completely attached to the camera 100, the lock pin 153 is engaged with the fitting hole 253.

Further, an accessory-side contact holding portion 254 is provided in a region positioned on the inside of the bayonet claws 252a to 252c. The accessory-side contact holding portion 254 holds electrical contacts (lens-side electrical contacts) 2001 to 2012.

The mount unit 550a of the intermediate accessory apparatus 500 has a configuration similar to that of the mount unit 250 illustrated in FIG. 2B. More specifically, the mount unit 550a includes an accessory-side contact holding portion that holds the electrical contacts (accessory-side electrical contacts) 2001 to 2012.

Figure 3:
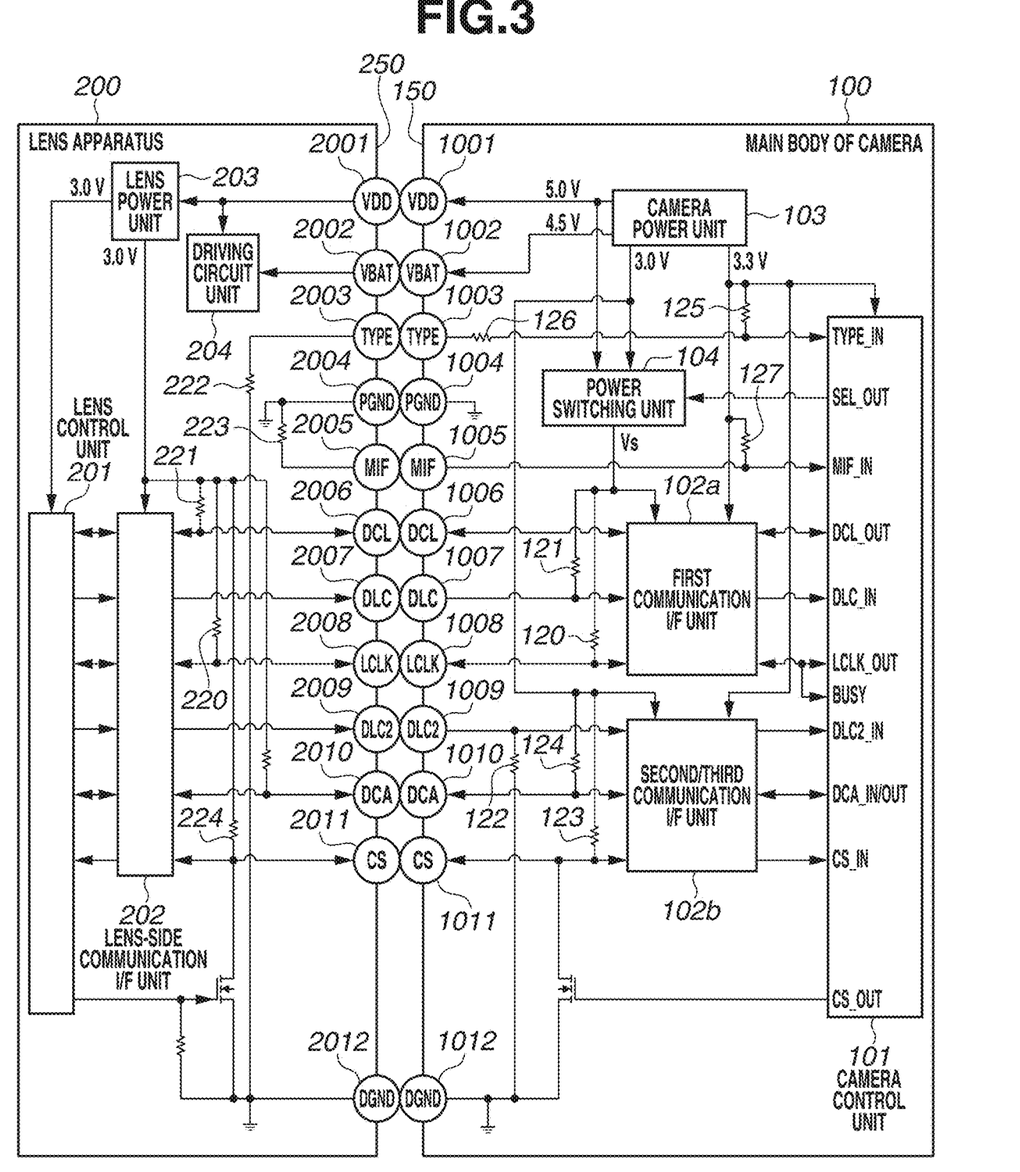
FIG. 3 is a block diagram illustrating example terminals of the lens apparatus and terminals of a camera.

Next, a case where the lens apparatus 200 is attached to the camera 100 will be described with reference to FIG. 3. FIG. 3 is a block diagram illustrating a circuit configuration of the camera 100 and the lens apparatus 200 in a state where the lens apparatus 200 is connected to the camera 100. The lens apparatus 200 and the camera 100 can communicate with each other via a communication path formed by some of the plurality of electrical contacts provided on the mount units 150 and 250. The lens apparatus 200 and the camera 100 can perform first communication, second communication, and third communication described below.

A camera control unit 101 as a camera control unit controls communication performed with the accessory apparatus attached to the camera 100 by controlling the output of the electrical contacts 1001 to 1012 provided on the mount unit 150 and processing signals input to the electrical contacts 1001 to 1012.

A camera power unit 103 is a power source used for operating each component of the camera 100 and the accessory apparatus attached to the camera 100. The camera power unit 103 generates a plurality of different voltages and supplies power of different voltages to respective components of the camera 100 or the accessory apparatus attached to the camera 100.

A power switching unit 104 supplies power to a first communication interface (I/F) unit 102a. Two types of power with different voltage values are supplied to the power switching unit 104 from the camera power unit 103, and the power to be supplied to the first communication I/F unit 102a can be switched under the control by the camera control unit 101.

A lens control unit 201 as a lens control unit controls communication performed between the camera 100 and the lens apparatus 200 by controlling the output of the electrical contacts 2001 to 2012 provided on the mount unit 250 and processing signals input to the electrical contacts 2001 to 2012.

A lens power unit 203 generates power of a predetermined voltage from the power supplied from the camera 100 and supplies the generated power to the lens control unit 201 and a lens-side communication I/F unit 202.

The electrical contacts 1001 and 2001 are terminals used to supply, from the camera power unit 103 to the lens apparatus 200, power mainly used for communication (communication power) between the camera 100 and the lens apparatus 200. Hereinafter, the electrical contacts 1001 and 2001 are sometimes referred to as "VDD terminals 1001 and 2001". In the present example embodiment, the voltage (hereinafter, referred to as "VDD voltage") of the power supplied from the VDD terminal 1001 to the lens apparatus 200 is 5.0 V.

The electrical contacts 1002 and 2002 are terminals used to supply, from the camera 100 to the lens apparatus 200, power (driving power) mainly used for operations of a driving system such as a motor. Hereinafter, the electrical contacts 1002 and 2002 are also referred to as "VBAT terminals 1002 and 2002". In the present example embodiment, the voltage (hereinafter, referred to as "VBAT voltage") of the power supplied from the VBAT terminal 1002 to the lens apparatus 200 is 4.5 V. Further, the VDD and VBAT terminals are also referred to collectively as "power system terminals".

The electrical contacts 1012 and 2012 are terminals that connect a communication control system circuit of the camera 100 and the lens apparatus 200 to the ground. In other words, the electrical contacts 1012 and 2012 are ground terminals corresponding to the VDD terminals 1001 and 2001. Hereinafter, the electrical contacts 1012 and 2012 are also referred to as "DGND terminals 1012 and 2012".

The electrical contacts 1004 and 2004 are terminals for connecting the driving system circuit including the motor provided on the camera 100 and the lens apparatus 200 to the ground. In other words, the electrical contacts 1004 and 2004 are ground terminals corresponding to the VBAT terminals 1002 and 2002. Hereinafter, the electrical contacts 1004 and 2004 are also referred to as "PGND terminals 1004 and 2004". Further, the DGND and PGND terminals are also referred to collectively as "ground terminals".

The electrical contacts 1005 and 2005 are terminals for detecting that the lens apparatus 200 is attached to the camera 100. The camera control unit 101 detects attachment and detachment of the lens apparatus 200 to and from the camera 100 based on the voltage level of the electrical contact 1005. If the camera control unit 101 detects that the lens apparatus 200 is attached, the camera control unit 101 starts supplying power to the lens apparatus 200 through the VDD terminal 1001 and the VBAT terminal 1002. Hereinafter, the electrical contacts 1005 and 2005 are also referred to as "MIF terminals 1005 and 2005".

The electrical contacts 1003 and 2003 are terminals for determining what type of accessory apparatus is attached to the camera 100. Hereinafter, the electrical contacts 1003 and 2003 are also referred to as "TYPE terminals 1003 and 2003".

The electrical contacts 1006 to 1008 and 2006 to 2008 are terminals used for the first communication. The first communication is communication performed between the camera 100 and the lens apparatus 200.

The electrical contacts 1009 and 2009 are used for the second communication. The second communication is communication for transmitting data from the lens apparatus 200 to the camera 100.

The electrical contacts 1010, 1011, 2010, and 2011 are terminals used for the third communication. The third communication is communication performed between the camera 100 and the lens apparatus 200. In a case where the intermediate accessory apparatus 500 is connected, the third communication is communication performed between the camera 100, the lens apparatus 200, and the intermediate accessory apparatus 500.

Next, the shapes of the camera-side contact holding portion 154 and the accessory-side contact holding portion 254 of the mount units 150 and 250 will be described with reference to FIGS. 4A and 4B.

Figure 4A:
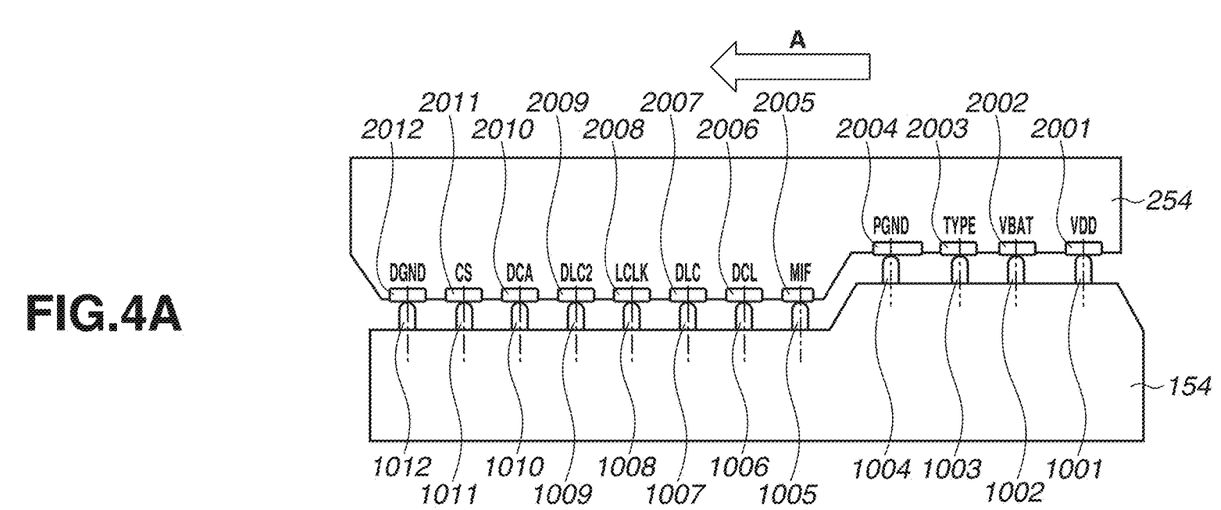
FIGS. 4A and 4B are diagrams illustrating an example arrangement of the terminals.

FIG. 4A is a schematic diagram illustrating the camera-side contact holding portion 154 and the accessory-side contact holding portion 254 viewed from a direction perpendicular to the optical axis in the state where the lens apparatus 200 is attached to the camera 100. FIG. 4B is a diagram illustrating a state where the lens apparatus 200 is being removed from the camera 100, which is viewed from the direction perpendicular to the optical axis. While the electrical contacts of the camera 100 are pins and the electrical contacts of the lens apparatus 200 are contact pieces in FIGS. 4A and 4B, the electrical contacts of the camera 100 can be contact pieces and the electrical contacts of the lens apparatus 200 can be pins.

An arrow A illustrated in FIG. 4A indicates a movement direction (predetermined direction) of the lens apparatus 200 with respect to the camera 100 when the lens apparatus 200 is removed from the camera 100. The movement direction is not a linear direction but a rotation direction. At the time of removing the lens apparatus 200, for example, the VDD terminal 2001 is brought into contact with the VBAT terminal 1002 and thereafter with the TYPE terminal 1003.

Figure 4B:
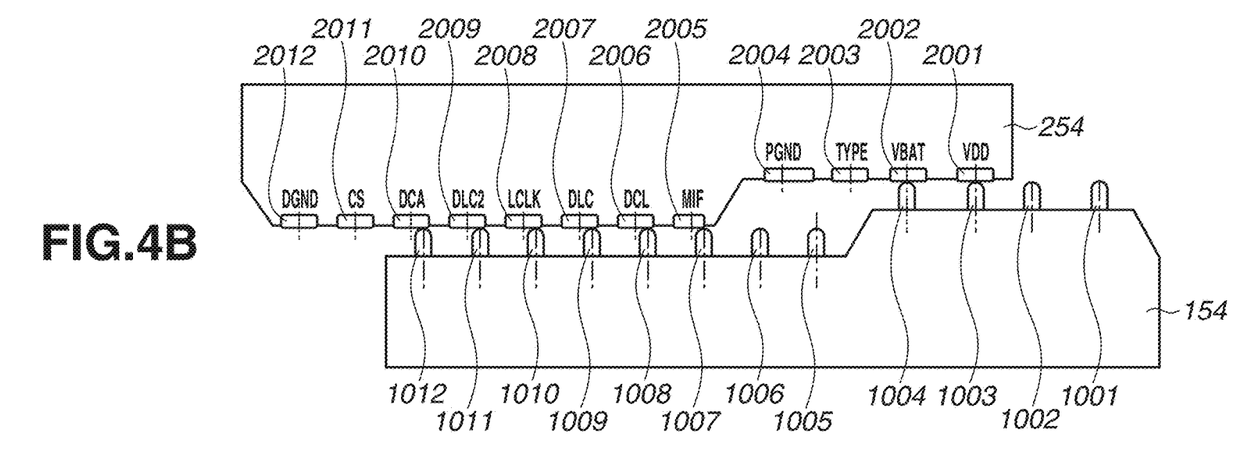

Further, as illustrated in FIGS. 4A and 4B, the camera-side contact holding portion 154 and the accessory-side contact holding portion 254 each have a step (level difference) in the optical axis direction. The electrical contacts 1001 to 1004 and 1005 to 1012 are provided on different levels. Similarly, the electrical contacts 2001 to 2004 and 2005 to 2012 are provided on different levels. This prevents the electrical contacts 2001 to 2004 and 1005 to 1012 from coming into contact during attachment and detachment of the lens apparatus 200 to and from the camera 100. In this way, the amount of abrasion of the electrical contacts during attachment and detachment of the lens apparatus 200 to and from the camera 100 can be reduced.

Further, the power system terminals of the camera 100 according to the present example embodiment are provided on the level that holds a smaller number of electrical contacts. Similarly, the power system terminals of the lens apparatus 200 according to the present example embodiment are provided on the level that holds a smaller number of electrical contacts. This further reduces the amount of abrasion of the power system terminals during attachment and detachment of the lens apparatus 200 to and from the camera 100 and prevents an increase in contact impedance. As a result, power is supplied stably for a long period of time.

In order to achieve stable power supply, it is desirable to provide the ground terminal to the level that holds a smaller number of electrical contacts.

Further, in order to reduce an effect of static electricity on an internal circuit, the DGND terminals 1012 and 2012 are respectively in contact with metal portions of the mount units 150 and 250. In order to facilitate processing of the mount unit 150, it is desirable to dispose the DGND terminal 1012 at an end of the arrangement of the electrical contacts 1001 to 1012. Similarly, in order to facilitate processing of the mount unit 250, it is desirable to dispose the DGND terminal 2012 at an end of the arrangement of the electrical contacts 2001 to 2012.

Accordingly, the PGND terminal 1004 is provided on the level that holds a smaller number of electrical contacts, and the DGND terminal 1012 is provided on the end of the arrangement of the electrical contacts 1001 to 1012. Similarly, the PGND terminal 2004 is provided on the level that holds a smaller number of electrical contacts, and the DGND terminal 2012 is provided on the end of the arrangement of the electrical contacts 2001 to 2012.

Next, an arrangement order of the electrical contacts of the camera-side contact holding portion 154 and the accessory-side contact holding portion 254 will be described.

In the present example embodiment, the PGND terminal 1004, the TYPE terminal 1003, the VBAT terminal 1002, and the VDD terminal 1001 are provided, in this order in an opposite direction to the arrow A, on the level of the camera-side contact holding portion 154 that holds a smaller number of electrical contacts. Similarly, the PGND terminal 2004, the TYPE terminal 2003, the VBAT terminal 2002, and the VDD terminal 2001 are provided, in this order in an attaching direction of the lens apparatus 200, on the level of the accessory-side contact holding portion 254 that holds a smaller number of electrical contacts.

If conductive foreign matter is caught between the camera-side contact holding portion 154 and the accessory-side contact holding portion 254 or the electrical contacts are deformed, the adjacent electrical contacts may be short-circuited. Especially in a case where the power system terminals (VDD terminal, VBAT terminal) and the ground terminal (PGND terminal) are short-circuited, a large amount of current can pass through a power circuit. An effect of the short-circuit on the power circuit can be reduced by providing another electrical contact between the power system terminal and the ground terminal.

The terminal to be provided between the power system terminal and the ground terminal is desirably a terminal with a signal level substantially constant while the camera 100 and the lens apparatus 200 are operating. Typically, a protection element for protecting the internal circuit of the camera 100 when a short-circuit occurs is provided between the terminal adjacent to the power system terminal and the camera control unit 101. If a terminal with a signal level that varies while the camera 100 and the lens apparatus 200 are operating is provided between the power system terminal and the ground terminal, the wiring capacity of the terminal is increased due to the protection element. Consequently, a signal waveform transmitted or received via the terminal may be affected. On the other hand, in the case of the terminal with the signal level that is substantially constant while the camera 100 and the lens apparatus 200 is operating, the effect of providing the protection element is small. While the terminals with a signal level that is substantially constant during operation are the TYPE terminal and the MIF terminal, since the MIF terminal is desirably provided on the level that holds a larger number of electrical contacts as described below, it is desirable to provide the TYPE terminal between the power system terminal and the ground terminal. In the present example embodiment, a resistor 126 as the protection element is provided between the TYPE terminal 1003 and the camera control unit 101.

The configurations of the camera 100 according to each example embodiment and the accessory apparatus attachable to the camera 100 are described above.

Next, various example embodiments of the present disclosure and a comparative example will be described below.

Hereinafter, the phrase "state of being attached to the camera 100" refers to a state where, as illustrated in FIG. 4A, all the corresponding electrical contacts of the camera 100 and the accessory apparatus (lens apparatus 200 or intermediate accessory apparatus 500) are in contact and are thus electrically connected. The phrase "being removed from the camera 100" refers to at least part of a period from the state where the accessory apparatus is attached to the camera 100 to a state where the VDD terminal 2001 is at a position beyond the DGND terminal 1012 in the direction (predetermined direction) of the arrow A in FIG. 4A.

Comparative Example

Figure 9:
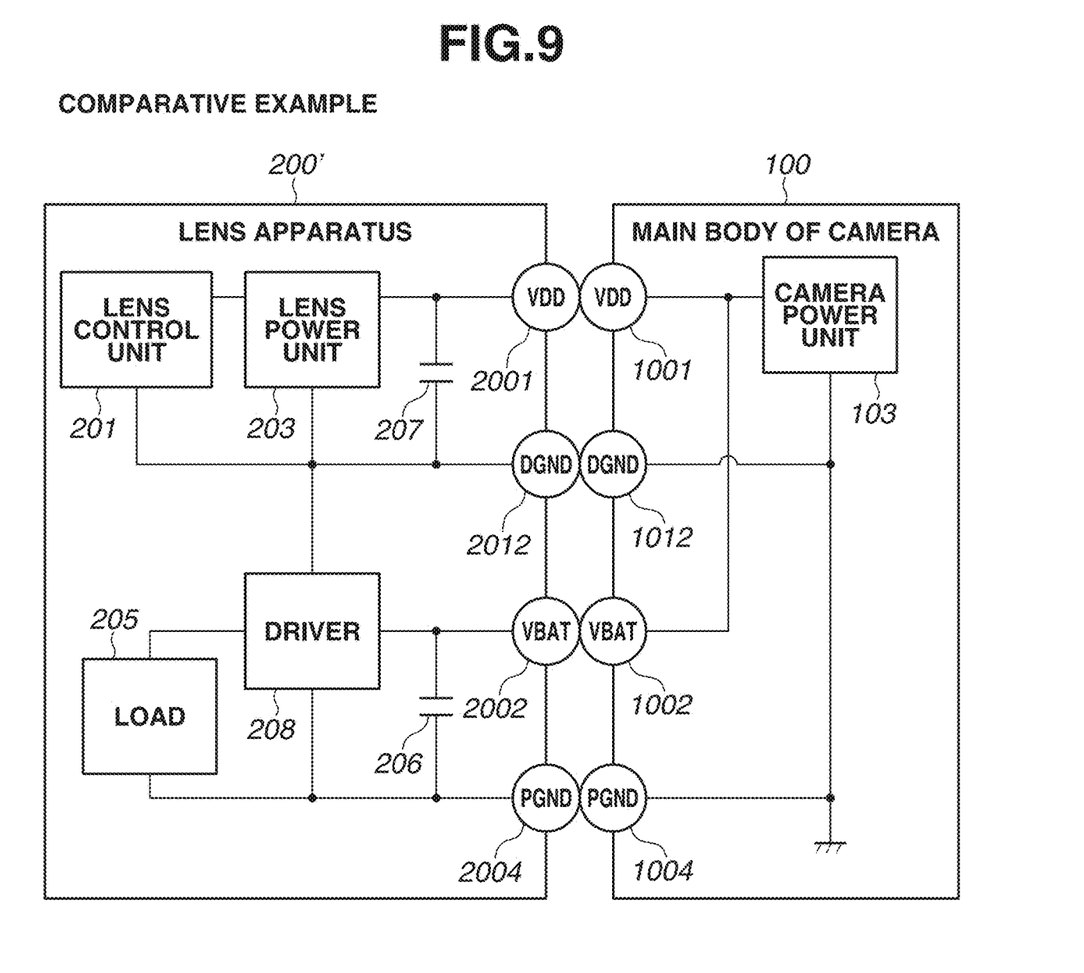
FIG. 9 is a block diagram illustrating a comparative example.

First, a circuit configuration of a lens apparatus 200', which is a comparative example of the lens apparatus 200 according to first and second example embodiments, will be described below with reference to FIG. 9. FIG. 9 illustrates a state where the lens apparatus 200' is directly connected to the camera 100 as in FIGS. 2 and 4A.

In FIG. 9, components relating to the first and second example embodiments described below are additionally illustrated. Further, in order to simplify the description, illustration of some of the electrical contacts illustrated in FIGS. 2A and 2B is omitted. While the arrangements of the electrical contacts in the lens apparatus 200' and the camera 100 are as described above, in order to make the illustration of the circuit configuration clearer, the arrangement of some of the electrical contacts is changed in FIG. 9.

The VBAT terminal (first electrical contact) 2002 of the lens apparatus 200' in the state of being attached to the camera 100 is an electrical contact that receives power from the camera power unit 103 through the VBAT terminal 1002. The received power is supplied to a load 205 through a driver 208 and consumed in the load 205. Examples of the load 205 include various actuators (driving units) for driving a driving target such as a diaphragm and a focus lens included in the imaging optical system 280 of the lens apparatus 200'.

The VDD terminal (fourth electrical contact) 2001 of the lens apparatus 200' in the state of being attached to the camera 100 is an electrical contact that receives power from the camera power unit 103 through the VDD terminal 1001. The received power is consumed by a unit having a lower power consumption than that of the load 205. For example, the power is used for a control system to be consumed by the lens control unit 201 when the lens control unit 201 controls the communication with the camera 100 and performs various calculations.

The PGND terminal (second electrical contact) 2004 of the lens apparatus 200' in the state of being attached to the camera 100 is connected to the PGND terminal (predetermined electrical contact) 1004 connected to the reference potential. In this way, a potential difference of 4.5 V is generated between the VBAT terminal 2002 and the PGND terminal 2004.

The DGND terminal (third electrical contact) 2012 of the lens apparatus 200' in the state of being attached to the camera 100 is connected to the reference potential via the DGND terminal 1012. In this way, a potential difference of 5.0 V is generated between the VDD terminal 2001 and the DGND terminal 2012.

The lens apparatus 200' includes a capacitor (capacitor device) 206 and a capacitor (second capacitor device) 207. One end of the capacitor 206 is connected to the VBAT terminal 2002 and the other end is connected to the PGND terminal 2004. The capacitor 206 stabilizes the power supplied through the VBAT terminal 2002. While the lens apparatus 200' is attached to the camera 100 and power is supplied to the VBAT terminal 2002, charge is stored in the capacitor 206. One end of the capacitor 207 is connected to the VDD terminal 2001 and the other end is connected to the DGND terminal 2012. The capacitor 207 stabilizes the power supplied through the VDD terminal 2001. While the lens apparatus 200' is attached to the camera 100 and the power is supplied to the VBAT terminal 2002, charge is stored in the capacitor 207.

The capacity of the capacitor 206 is desirably larger than the capacity of the capacitor 207 for two reasons. The first reason is that the consumption of power for the control system is lower than the consumption of power for the driving system. The second reason is that in general noise is prone to be generated in the power circuit for the driving system including the VBAT terminal 2002 and the PGND terminal 2004 due to an effect of a counter-electromotive voltage generated at the time of driving the actuator. Increasing the capacitance component of the power circuit for the driving system changes a characteristic indicating a frequency-noise relationship, and noise can be reduced easily in a wider frequency range. Further, in order to further stabilize the power supplied to the circuit, a filter (not illustrated) may be inserted into the power circuit for the driving system. For example, a π-type filter can be inserted to increase the capacitance component of the power circuit for the driving system and thereby to reduce noise.

In the state where the lens apparatus 200' is attached to the camera 100, the power circuit for the driving system and the power circuit for the control system are electrically separated in the lens apparatus 200'. In other words, the current passing through the power circuit for the driving system is prevented from passing through the power circuit for the control system. In this way, noise generated in the power circuit for the driving system including the VBAT terminal 2002 and the PGND terminal 2004 is prevented from being superposed on the power circuit for the control system including the VDD terminal 2001 and the DGND terminal 2012.

A potential change generated while the lens apparatus 200' is removed from the camera 100 will be described below with reference to FIG. 4B.

While the lens apparatus 200' is removed from the camera 100, there is a moment at which the lens apparatus 200' and the camera 100 become the state illustrated in FIG. 4B. As illustrated in FIG. 4B, the VBAT terminal 2002 and the PGND terminal 1004 are in contact with each other and the PGND terminal 2004 is in contact with none of the electrical contacts of the camera 100. Thus, while the lens apparatus 200' is removed from the camera 100, the PGND terminal 2004 becomes unconnected to the reference potential.

At this time, the VBAT terminal 2002 is connected to the reference potential of the camera 100 via the PGND terminal 1004, so that the potential of the VBAT terminal 2002 becomes 0 V. Meanwhile, the charge is stored in the capacitor 206, so that a negative voltage is applied across the VBAT terminal 2002 and the PGND terminal 2004. If the negative voltage is applied across the VBAT terminal 2002 and the PGND terminal 2004 as described above and if this state is continued for a long period of time, a problem, for example, damage of the electrical components connected to the PGND terminal 2004, may arise in the lens apparatus 200'.

Figure 5:
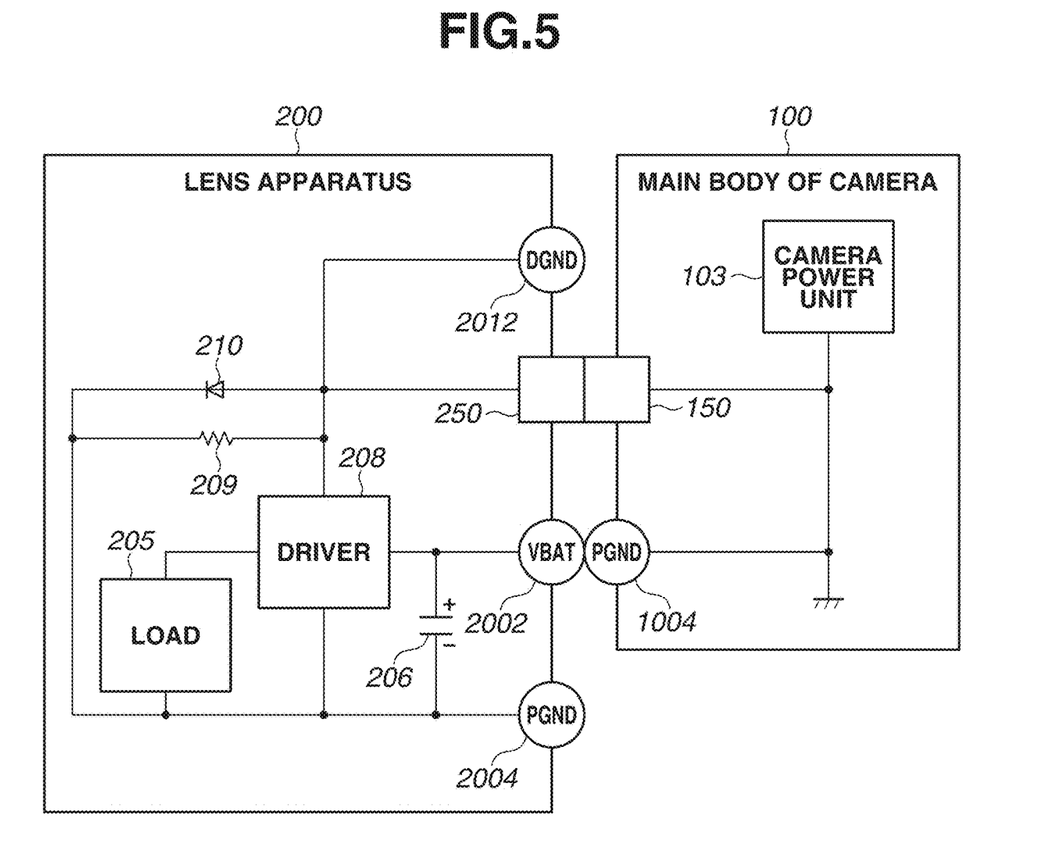
FIG. 5 is a block diagram illustrating an electrical circuit configuration of the lens apparatus according to a first example embodiment.

Next, the lens apparatus 200 according to a first example embodiment will be described with reference to FIG. 5. FIG. 5 illustrates an electrical circuit configuration of the lens apparatus 200. In FIG. 5, the lens apparatus 200 includes the lens control unit 201, the lens power unit 203, the VDD terminal 2001, the VBAT terminal 2002, the PGND terminal 2004, the DGND terminal 2012, and the capacitors 206 and 207 as in the lens apparatus 200'. The lens apparatus 200 further includes the driver 208 and the load 205 as in the lens apparatus 200'. In FIG. 5, the lens control unit 201 and the VDD terminal 2001 is omitted. Further, a reduction unit configured to reduce the charge stored in the capacitor 206 while the lens apparatus 200 is removed from the camera 100 is included. In the present example embodiment, the reduction unit is a low resistor 209 (i.e., resistor having low resistance) and a diode 210 disposed on a circuit connecting the DGND terminal 2012 and the PGND terminal 2004.

FIG. 5 illustrates a moment at which the VBAT terminal 2002 and the PGND terminal 1004 are in contact with each other as in FIG. 4B.

The DGND terminal 2012 is in contact with the metal portion of the mount unit 250, and the mount unit 250 is in contact with the metal portion of the mount unit 150. Since the mount unit 150 is connected to the reference potential in the camera 100, the potentials of the mount unit 250 and the DGND terminal 2012 become the reference potential while the lens apparatus 200 is being removed from the camera 100. In FIG. 5, the mount units 250 and 150 are schematically illustrated so as to indicate that the mount units 250 and 150 are at the reference potential.

The flow direction of a current in the diode 210 is the direction from the DGND terminal 2012 toward the capacitor 206. Thus, if the VBAT terminal 2002 and the PGND terminal 1004 are brought into contact with each other during removal from the camera 100 and the potential of the PGND terminal 2004 becomes lower than the potential of the DGND terminal 2012, which is the reference potential, the current flows in the diode 210 and the low resistor 209. The flowing current neutralizes the charge stored in the capacitor 206.

In other words, as the VBAT terminal 2002 is connected to the PGND terminal 1004, the low resistor 209 and the diode 210 are electrically connected to the reference potential and the PGND terminal 2004. Consequently, a negative voltage is applied across the VBAT terminal 2002 and the PGND terminal 2004 at the moment of a change to the state illustrated in FIG. 5, but the current passing through the low resistor 209 and the diode 210 gradually reduces the charge stored in the capacitor 206. As a result, at least part of the charge stored in the capacitor 206 can be discharged.

As described above, the lens apparatus 200 according to the first example embodiment is capable of reducing the absolute value of the negative voltage applied across the VBAT terminal 2002 and the PGND terminal 2004 and reducing the period of time during which the negative voltage is applied. This reduces the possibility that a problem occurs in the electrical element of the lens apparatus 200.

While the case where the low resistor 209 and the diode 210 are used as the reduction unit for reducing the charge stored in the capacitor 206 is described in the present example embodiment, the reduction unit may be one of the low resistor 209 and the diode 210. In the case of using one of the low resistor 209 and the diode 210, use of the diode 210 is desirable. The charge flow faster in the diode 210 than in the low resistor 209, so that the negative voltage applied across the VBAT terminal 2002 and the PGND terminal 2004 can be reduced faster in the case of using the diode 210 than in the case of using the low resistor 209.

Figure 6:
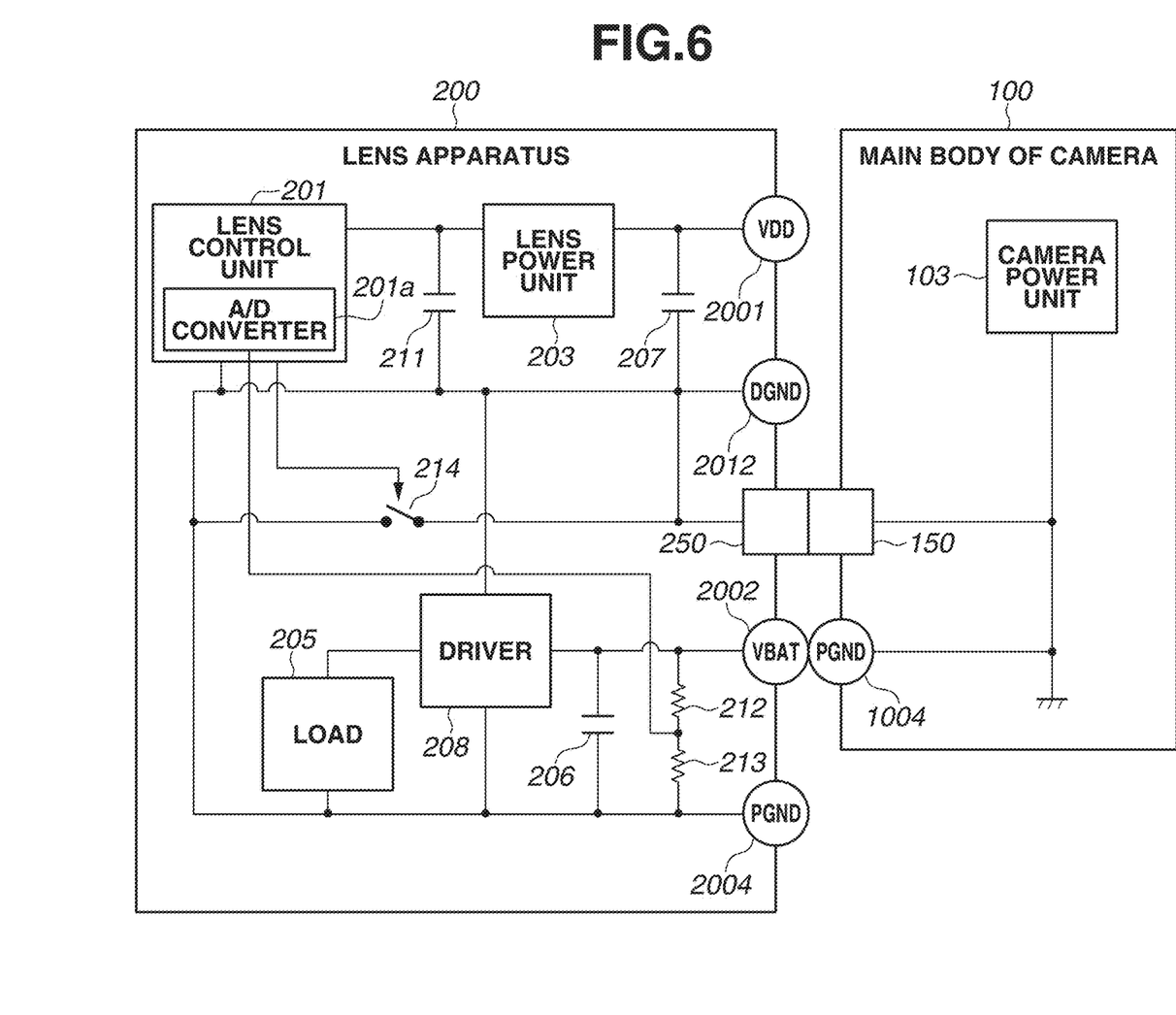
FIG. 6 is a block diagram illustrating an electrical circuit configuration of the lens apparatus according to a second example embodiment.

FIG. 6 illustrates an electrical circuit configuration of the lens apparatus 200 according to a second example embodiment. The lens apparatus 200 according to the second example embodiment is different from the lens apparatus 200 according to the first example embodiment mainly in that the configuration of the reduction unit is different. The reduction unit in the lens apparatus 200 according to the second example embodiment is the lens control unit 201 and a switch 214.

Further, a capacitor 211 is connected to the output side of the lens power unit 203. During removal from the camera 100, the electrical connection between the VDD terminals 2001 and 1001 is released, and the state is changed to a state where power is not supplied to the lens control unit 201 from the VDD terminal 2001. Accordingly, the capacitor 211 is charged while the lens apparatus 200 is attached to the camera 100, and the capacitor 211 is discharged when the lens apparatus 200 is removed from the camera 100, so that the lens control unit 201 is operable for a short period of time at the time of the removal.

The lens control unit 201 includes an analog-to-digital (A/D) converter 201a. The voltage applied to the VBAT terminal 2002 is divided by resistors 212 and 213 and then input to the A/D converter 201a of the lens control unit 201. For example, in a case where the resistance values of the resistors 212 and 213 are each 10 kΩ, the voltage of 4.5 V applied to the VBAT terminal 2002 is divided into 2.25 V. This prevents the lens control unit 201 from being damaged by application of a voltage from the VBAT terminal 2002, to which a voltage of 4.5 V is applied, to the lens control unit 201, which is driven at 3.0 V.

The rest of the configuration of the lens apparatus 200 according to the second example embodiment is similar to that of the lens apparatus 200 according to the first example embodiment, so that detailed description of common components is omitted.

In the present example embodiment, the lens control unit 201 has a function as a detection unit configured to detect a voltage applied across the VBAT terminal 2002 and the PGND terminal 2004 and a function as a control unit configured to control the switch 214 based on the detection result.

First, the function as the detection unit will be described. The lens control unit 201 detects a voltage applied to the A/D converter 201a. In the case where the lens apparatus 200 is attached to the camera 100, the DGND terminal 1012 and the PGND terminal 1004 are connected in the camera 100. Thus, the lens control unit 201 can detect the voltage applied to the A/D converter 201a using the DGND terminal 2012 as a reference. The lens control unit 201 detects the voltage applied to the A/D converter 201a and detects the voltage applied across the VBAT terminal 2002 and the PGND terminal 2004 using a voltage-dividing ratio of the resistors 212 and 213 that is stored in advance in a memory (not illustrated). In the above-described example, the voltage applied to the A/D converter 201a is 2.25 V, and the voltage applied across the VBAT terminal 2002 and the PGND terminal 2004 is 4.5 V.

Next, the function as the control unit will be described. The lens control unit 201 controls the switch 214, which is capable of switching a state of an electrical connection between the VBAT terminal 2002 and the DGND terminal 2012, based on the result of detection of the voltage applied across the VBAT terminal 2002 and the PGND terminal 2004. During normal time, the lens control unit 201 opens the switch 214 to separate the mount unit 250 and the circuit connecting the DGND terminal 2012 and the PGND terminal 2004. If the VBAT terminal 2002 and the PGND terminal 1004 are connected and an abnormal voltage applied across the VBAT terminal 2002 and the PGND terminal 2004 is detected, the switch 214 is closed to short-circuit the circuit. The switch 214 is short-circuited, so that the charge stored in the capacitor 206 can be reduced.

The switch 214 can be any type of element capable of switching terminals of an analog switch integrated circuit (IC) between an open state and a short-circuit state.

Figure 7:
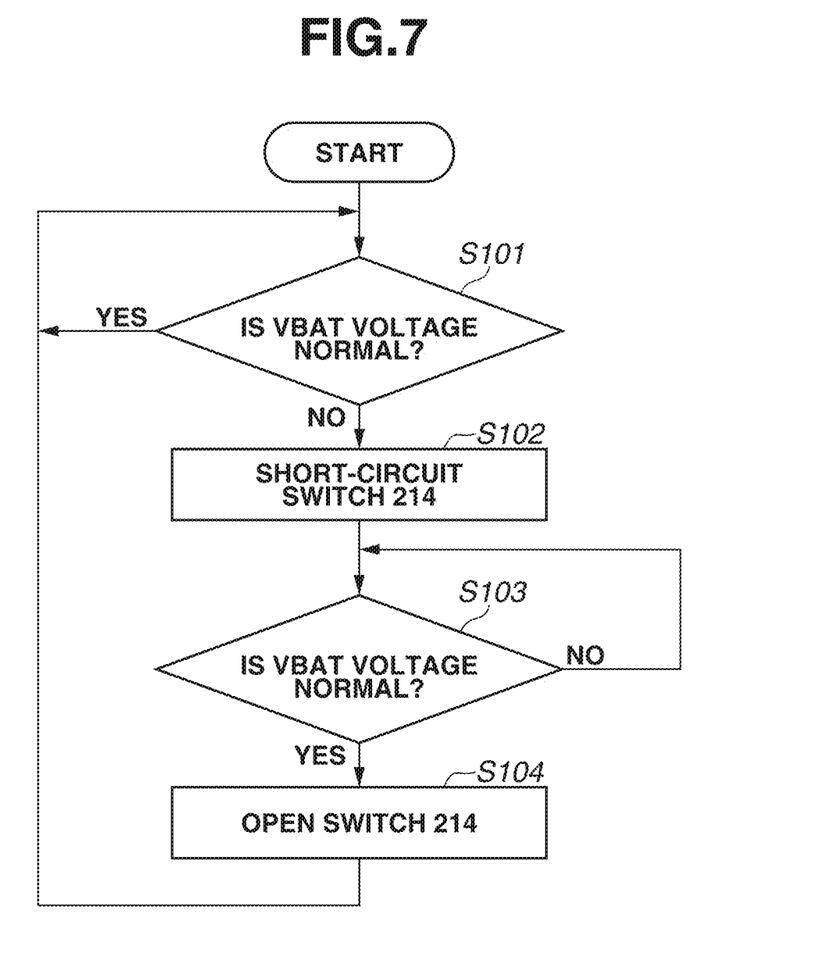
FIG. 7 is a flowchart illustrating a process of a lens control unit according to the second example embodiment.

FIG. 7 is a flowchart illustrating a process performed by the lens control unit 201. The lens control unit 201 executes the process illustrated in FIG. 7 according to a program stored in an internal memory (not illustrated) of the lens apparatus 200.

In step S101, the lens control unit 201 determines whether the voltage applied across the VBAT terminal 2002 and the PGND terminal 2004 is normal (i.e., whether the applied voltage is within a rated range). In step S101, if the lens control unit 201 determines that the applied voltage is normal (YES in step S101), step S101 is repeated.

On the other hand, in step S101, if the lens control unit 201 determines that the applied voltage is not normal (NO in step S101), i.e., if the lens control unit 201 determines that an abnormal voltage that exceeds a predetermined value is applied across the VBAT terminal 2002 and the PGND terminal 2004, the processing proceeds to step S102. In step S102, the lens control unit 201 short-circuits the switch 214 provided between the DGND terminal 2012 and the PGND terminal 2004. In this way, the charge stored in the capacitor 206 are gradually discharged. Thus, application of a negative voltage for a long period of time across the VBAT terminal 2002 and the PGND terminal 2004 is prevented.

In step S103, the lens control unit 201 determines again whether the voltage applied across the VBAT terminal 2002 and the PGND terminal 2004 is normal. If the lens control unit 201 determines that the applied voltage is not normal (NO in step S103), the lens control unit 201 repeats the processing in step S103.

On the other hand, in step S103, if the lens control unit 201 determines that the voltage at the VBAT terminal 2002 is normal (YES in step S103), the processing proceeds to step S104. In step S104, the lens control unit 201 returns the switch 214 to the original open state.

After step S104, the lens control unit 201 repeats steps S101 to S104 until the supply of power to the lens control unit 201 through the capacitor 211 is ended.

As described above, in the second example embodiment, the charge stored in the capacitor 206 can be gradually reduced using the reduction unit, which is the lens control unit 201 and the switch 214.

As described above, the lens apparatus 200 according to the second example embodiment is capable of reducing the absolute value of the negative voltage applied across the VBAT terminal 2002 and the PGND terminal 2004 and reducing the period of time during which the negative voltage is applied across the VBAT terminal 2002 and the PGND terminal 2004. This reduces the possibility that a problem occurs in the electrical element of the lens apparatus 200.

The lens control unit 201 only needs to directly or indirectly determine whether the voltage applied across the VBAT terminal 2002 and the PGND terminal 2004 is normal, and the lens control unit 201 does not necessarily need to calculate the voltage applied across the VBAT terminal 2002 and the PGND terminal 2004. The lens control unit 201 only needs to control the switch 214 based on an index having a correlation with the voltage applied across the VBAT terminal 2002 and the PGND terminal 2004. For example, the lens control unit 201 can control the switch 214 based on whether the voltage value of the A/D converter 201a is normal.

The present disclosure is applicable to an intermediate accessory apparatus, which is an accessory apparatus to be disposed between the lens apparatus 200 and the camera 100.

Figure 8:
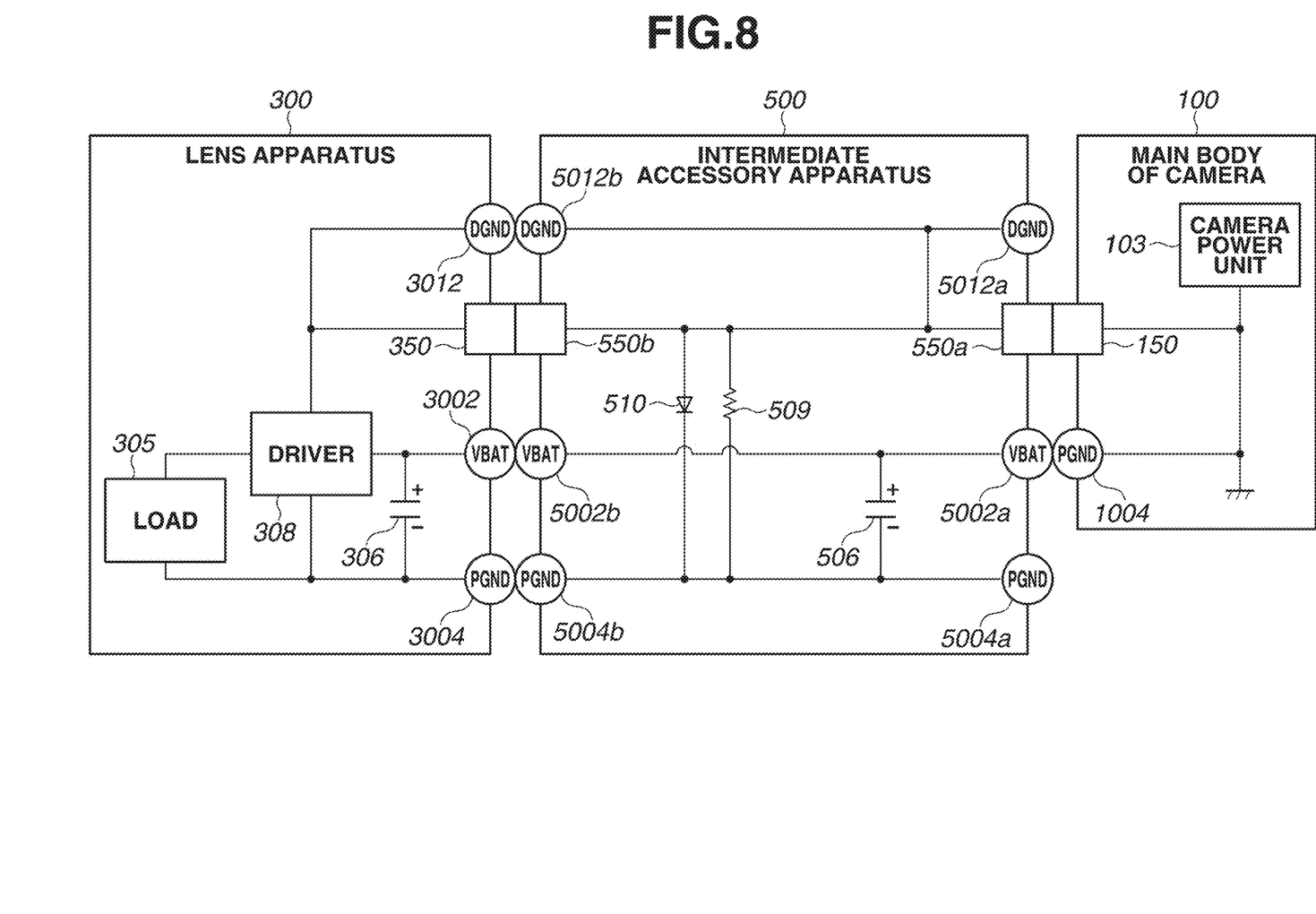
FIG. 8 is a block diagram illustrating an electrical circuit configuration of the intermediate accessory apparatus according to a third example embodiment.

FIG. 8 illustrates an electrical circuit configuration of the intermediate accessory apparatus 500 as an accessory apparatus according to a third example embodiment. The intermediate accessory apparatus 500 can be a converter for adjusting the focal length or a conversion adapter for enabling communication between the camera 100 and a lens apparatus that is not capable of directly communicating with the camera 100.

In FIG. 8, a mount unit 350, a VBAT terminal 3002, a PGND terminal 3004, and a DGND terminal 3012 are respectively similar to a mount unit, the VBAT terminal 2002, the PGND terminal 2004, and the DGND terminal 2012 of the lens apparatus 200'. Further, a capacitor 306, a driver 308, and a load 305 of a lens apparatus 300 are respectively similar to the capacitors 206 and 207, the driver 208, and the load 205 of the lens apparatus 200'. The arrangement of the electrical contacts is similar to the arrangement of the corresponding electrical contacts of the lens apparatus 200'.

The intermediate accessory apparatus 500 includes the mount unit 550a, and a DGND terminal 5012a connectable to the DGND terminal 1012, a VBAT terminal 5002a connectable to the VBAT terminal 1002, and a PGND terminal 5004a connectable to the PGND terminal 1004 on the mount unit 550a. The intermediate accessory apparatus 500 further includes a VDD terminal (not illustrated) connectable to the VDD terminal 1001. Further, the intermediate accessory apparatus 500 includes the mount unit 550b, and a DGND terminal 5012b connectable to a DGND terminal 3012, a VBAT terminal 5002b connectable to the VBAT terminal 3002, and a PGND terminal 5004b connectable to the PGND terminal 3004 on the mount unit 550b. The intermediate accessory apparatus 500 further includes a VDD terminal (not illustrated) connectable to a VDD terminal of the lens apparatus 300.

The intermediate accessory apparatus 500 receives power from the camera 100 through the VBAT terminal 5002a and supplies power to the lens apparatus 300 through the VBAT terminals 5002b and 3002. Further, the intermediate accessory apparatus 500 receives power from the camera 100 through the VDD terminal disposed on the mount unit 550a side of the intermediate accessory apparatus 500. Then, the intermediate accessory apparatus 500 supplies power to the lens apparatus 300 through the VDD terminal disposed on the mount unit 550b side of the intermediate accessory apparatus 500 and the VDD terminal of the lens apparatus 300.

The intermediate accessory apparatus 500 includes a capacitor 506, which is electrically connected to the VBAT terminal 5002a and the PGND terminal 5004a. The intermediate accessory apparatus 500 further includes a capacitor (not illustrated) that is electrically connected to the VDD terminal disposed on the mount unit 550a side of the intermediate accessory apparatus 500 and the DGND terminal 5012a.

Further, the intermediate accessory apparatus 500 further includes a reduction unit configured to reduce the charge stored in the capacitor 506 during removal of the intermediate accessory apparatus 500 from the camera 100. In the present example embodiment, the reduction unit is a low resistor 509 (i.e., resistor having low resistance) and a diode 510 disposed on a circuit connecting the DGND terminal 5012a and the PGND terminal 5004a.

FIG. 8 illustrates a state where the intermediate accessory apparatus 500 attached to the lens apparatus 300 is being removed from the camera 100. If the VBAT terminal 5002a and the PGND terminal 1004 are connected during the removal from the camera 100, the low resistor 509 and the diode 510 function similarly to the low resistor 209 and the diode 210 according to the first example embodiment. More specifically, the low resistor 509 and the diode 510 electrically connect the DGND terminal 5012a and the PGND terminal 5004a, so that the charge stored in the capacitor 506 are gradually reduced.

As described above, the intermediate accessory apparatus 500 according to the third example embodiment is capable of reducing the absolute value of the negative voltage applied across the VBAT terminal 2002 and the PGND terminal 5004a and reducing the period of time during which the negative voltage is applied. This reduces the possibility that a problem occurs in the electrical element of the intermediate accessory apparatus 500.

The reduction unit according to the present example embodiment can be one of the low resistor 509 and the diode 510. Further, the configuration of the lens apparatus 300 can be similar to that of the lens apparatus 200 according to the first and second example embodiments.

A camera system according to an example embodiment of the present disclosure includes the accessory apparatus according to any of the above-described example embodiments and an image capturing apparatus. The image capturing apparatus includes a power source that supplies power to the VBAT terminal (2002 and 5002a) of the accessory apparatus and the PGND terminal (electrical contact) 1004 capable of connecting a PGND terminal to the reference potential in the state where the accessory apparatus is attached.

While various example embodiments of the present disclosure have been described, the present disclosure is not limited to these example embodiments, and various modifications and changes are possible within the spirit of the disclosure. For example, the numerical values used in the disclosure are mere examples and can be any other values. Further, the accessory apparatus according to the example embodiments of the present disclosure can be an intermediate accessory apparatus to which the configuration of the lens apparatus 200 is applied.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2018-137136, filed Jul. 20, 2018, which is hereby incorporated by reference herein in its entirety.

What is claimed is:

1. An accessory apparatus configured to be attachable to an image capturing apparatus and to be moved in a predetermined direction with respect to the image capturing apparatus so that the accessory apparatus is detached from the image capturing apparatus, the accessory apparatus comprising:

a first electrical contact configured to receive power from the image capturing apparatus in a state of being attached to the image capturing apparatus;

a second electrical contact disposed on a side of the predetermined direction of the first electrical contact, configured to be connected to a predetermined electrical contact connected to a reference potential of the image capturing apparatus in the state of being attached to the image capturing apparatus, and to be unconnected to the reference potential during removal from the image capturing apparatus;

a third electrical contact configured to be connected to the reference potential;

a capacitor device with one end connected to the first electrical contact and another end connected to the second electrical contact; and a reduction circuitry configured to electrically connect the second electrical contact and the third electrical contact, and configured to reduce charge stored in the capacitor device during the removal from the image capturing apparatus.

2. The accessory apparatus according to claim 1, wherein the reduction circuitry reduces the charge stored in the capacitor device when the first electrical contact is connected to the predetermined electrical contact during the removal from the image capturing apparatus.

3. The accessory apparatus according to claim 1, wherein the reduction circuitry includes at least one of a diode and a resistor, disposed in a circuit connecting the second electrical contact and the third electrical contact.

4. The accessory apparatus according to claim 1, wherein the reduction circuitry includes:
   a detection circuitry configured to detect a voltage applied across the first electrical contact and the second electrical contact;
   a switch that switches a state of an electrical connection between the second electrical contact and the third electrical contact; and
   a controller configured to control the switch based on a result of the detection by the detection circuitry.

5. The accessory apparatus according to claim 1, further comprising:
   a fourth electrical contact configured to receive power from the image capturing apparatus in the state of being attached to the image capturing apparatus; and
   a second capacitor device with one end connected to the third electrical contact and another end connected to the fourth electrical contact.

6. The accessory apparatus according to claim 1, wherein a circuit including the first electrical contact and the second electrical contact and a circuit including the third electrical contact and the fourth electrical contact in the accessory apparatus in the state of being attached to the image capturing apparatus are electrically separated.

7. The accessory apparatus according to claim 6, further comprising:
   an optical system; and
   an actuator configured to drive part of the optical system, wherein the power supplied to the first electrical contact is consumed by the actuator, and
   wherein the power supplied to the fourth electrical contact is consumed by a unit having a lower power consumption than a power consumption of the actuator.

8. A camera system comprising:
   an accessory apparatus; and
   an image capturing apparatus to which the accessory apparatus is attachable and which includes a power source configured to supply power to the accessory apparatus through a first electrical contact and an electrical contact capable of connecting a second electrical contact to a reference potential in a state where the accessory apparatus is attached to the image capturing apparatus,
   wherein the accessory apparatus is attachable to the image capturing apparatus and is moved in a predetermined direction with respect to the image capturing apparatus so that the accessory apparatus is detached from the image capturing apparatus, and
   wherein the accessory apparatus includes:
   the first electrical contact configured to receive power from the image capturing apparatus in a state of being attached to the image capturing apparatus;
   the second electrical contact disposed on a predetermined direction side of the first electrical contact, configured to be connected to a predetermined electrical contact connected to the reference potential of the image capturing apparatus in the state of being attached to the image capturing apparatus, and configured to be unconnected from the reference potential during removal from the image capturing apparatus;
   a third electrical contact connected to the reference potential;
   a capacitor device with one end connected to the first electrical contact and another end connected to the second electrical contact; and
   a reduction circuitry configured to electrically connect the second electrical contact and the third electrical contact, and configured to reduce charge stored in the capacitor device during the removal from the image capturing apparatus.

* * * * *